(12) United States Patent
Suzuki (10) Patent No.: US 6,183,526 B1
(45) Date of Patent: Feb. 6, 2001

(54) FILTER APPARATUS FOR CANISTER

(75) Inventor: Hayato Suzuki, Hamakita (JP)

(73) Assignee: Toyo Roki Seizo Kabushiki Kaisha, Shizuoka-ken (JP)

( * ) Notice: Under 35 U.S.C. 154(b), the term of this patent shall be extended for 0 days.

(21) Appl. No.: 09/250,291

(22) Filed: Feb. 17, 1999

(30) Foreign Application Priority Data

Feb. 17, 1998 (JP) .................................................. 10-034374
Nov. 18, 1998 (JP) .................................................. 10-328194

(51) Int. Cl.[7] .................................................. B01D 35/147
(52) U.S. Cl. .............................. 55/311; 55/313; 55/385.3; 55/417; 55/420; 96/136
(58) Field of Search .............................. 96/134, 135, 136, 96/137, 143, 144; 55/310, 311, 313, 385.3, 417, 420

(56) References Cited

U.S. PATENT DOCUMENTS

| 3,257,995 | * | 6/1966 | Schnabel | ................................. 55/420 |
| 3,318,075 | * | 5/1967 | Wilson | ................................. 55/420 |
| 3,731,678 | | 5/1973 | Pyzel . | |
| 4,177,145 | | 12/1979 | Schumacher . | |
| 4,192,751 | * | 3/1980 | Henton et al. | ........................ 55/417 |
| 5,400,753 | * | 3/1995 | Andress et al. | ........................ 55/313 |
| 5,635,630 | | 6/1997 | Dawson et al. . | |
| 5,858,034 | * | 1/1999 | Shida et al. | ........................... 55/313 |

FOREIGN PATENT DOCUMENTS

| 628597 | * | 4/1936 | (DE) | ...................................... 55/420 |
| 2181967 | * | 5/1987 | (GB) | ...................................... 96/137 |
| 9-119351 | | 5/1997 | (JP) . | |

* cited by examiner

Primary Examiner—C. Scott Bushey
(74) Attorney, Agent, or Firm—Young & Thompson (57) ABSTRACT

A filter apparatus 20 is connected to an outlet portion of a canister mounted on a fuel supply system for a vehicle. A housing 21 and a filter element 30 are provided. The housing 21 has a connection-opening portion 25 connected to the outlet portion and atmospheric release opening portion 26 communicating with the atmosphere. The filter element 30 is received in the housing 21 so that one end of a hollow portion 31a passing through the center of a filter body 31 is connected to the connection opening portion 25 from the inner side of the housing 21. The hollow portion 31a of the filter element 30 is utilized as a part of a passage for introducing fluid, which has been introduced from the connection opening portion 25 into the housing 21, into the atmospheric release opening portion 26. There is provided at the other end of the hollow portion 31a a one-way valve 33 permitting the fluid to discharge from the side of the other end of the hollow portion 31a and preventing the fluid from flowing from the side of the above-mentioned other end into the hollow portion 31a.

4 Claims, 8 Drawing Sheets

PRIOR ART

FILTER APPARATUS FOR CANISTER

BACKGROUND OF THE INVENTION

1. Field of the Invention

The present invention relates to a filter apparatus, which is to be used in combination with a canister for removing toxic substances from a vaporous fuel generated in a fuel tank or the like for an internal combustion engine.

2. Description of the Related Art

A vaporous fuel generated in a fuel tank mounted on a vehicle contains substances, which is harmful to an environment. Such a vaporous fuel should therefore not be discharged into the atmosphere without being subjected to a specific treatment. There has conventionally been taken a countermeasure of provision of a canister receiving adsorbent such as an activated carbon or the like and connected to a generation route of the vaporous fuel so as to remove the toxic substances from the vaporous fuel by means of the canister to obtain a clean air and then to discharge the thus obtained clean air into the atmosphere.

The vaporous fuel is not always introduced into the above-mentioned canister. When the pressure of the fuel tank becomes for example negative, the canister sucks in air. The sucked air and substances adsorbed by the adsorbent are mixed and then returned to a fuel system. When the air sucked by the canister contains foreign matters, the foreign matters may be accumulated in the canister, thus deteriorating its performance. In view of these problems, a filter apparatus is connected to the outlet portion of the canister, which communicates with the atmosphere.

Figure 8:
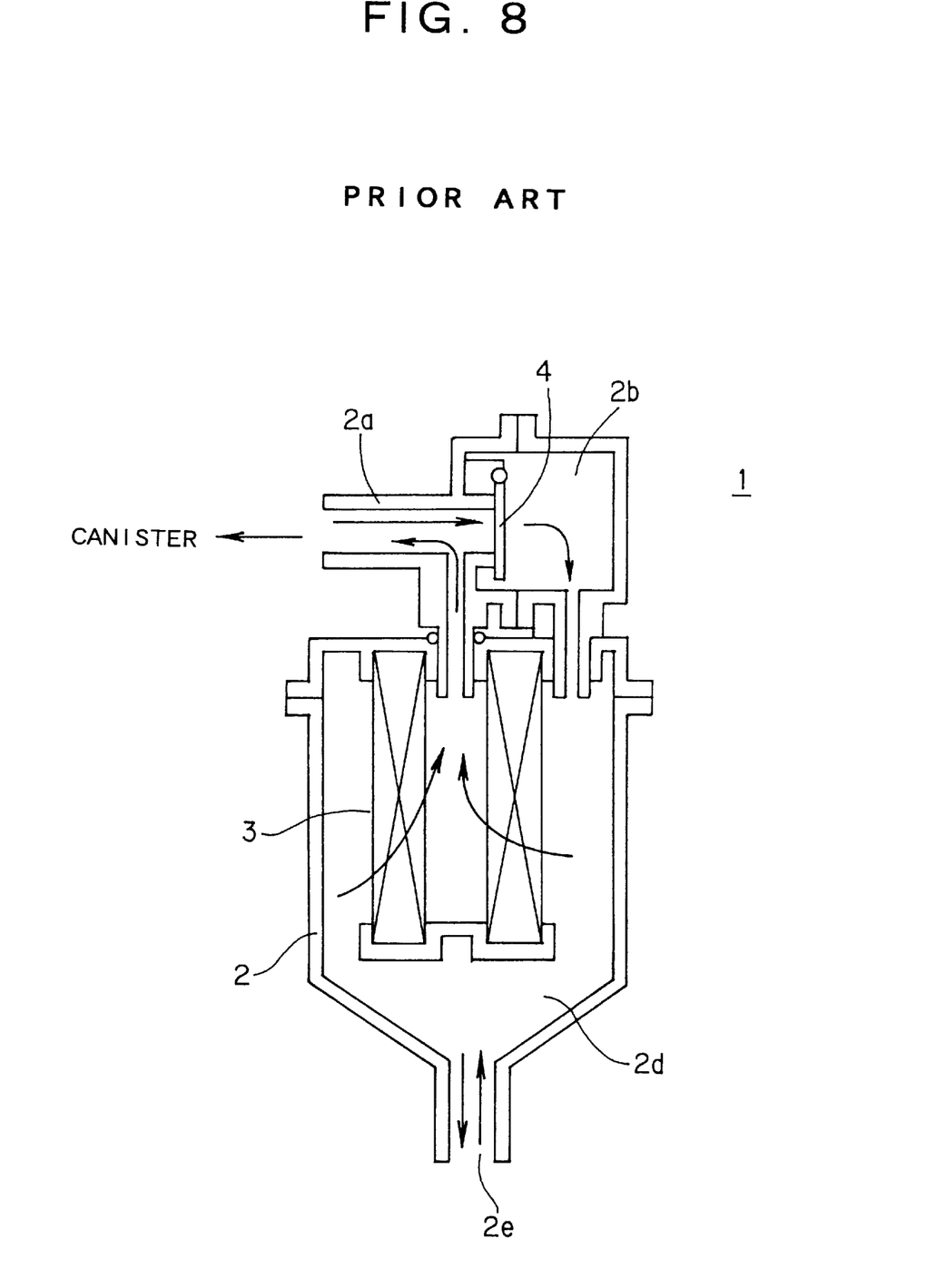
FIG. 8 is a vertical sectional view illustrating the conventional filter apparatus for a canister.

As the filter apparatus for a canister, there has conventionally been used a filter apparatus as shown in FIG. 8. The filter apparatus 1 is provided with a housing 2 made of synthetic resin, a filter element 3 received in the housing 2 and a one-way valve 4 for opening or closing a passage, which can bypass the filter element 3. Air discharged from the canister (not shown) is introduced into a connection-opening portion 2a of the housing 2. Fluid introduced into the connection opening portion 2a opens the one-way valve 4 to enter a valve chamber 2b. The fluid in the valve chamber 2b is then discharged through an element chamber 2d and an atmospheric release-opening portion 2e into the atmosphere. When the pressure at the side of the canister becomes negative, air is sucked from the atmospheric release-opening portion 2e of the housing 2 into the element chamber 2d. The thus sucked air is filtered through the filter element 3 and then introduced into the canister through the connection-opening portion 2a.

According to the above-described filter apparatus 1, the air discharged from the canister bypasses the filter element 3 and discharges into the atmosphere, thus leading to the maintenance of a small exhaust resistance. The air sucked into the canister is securely filtered through the filter element 3 on the other hand.

However, in the conventional filter apparatus 1 described above, the passage for discharging the fluid supplied from the canister and the passage for the air filtered through the filter element 3 are separated from each other at the region of the connection opening portion 2a. Such a structure requires the other valve chamber 2b provided other than the element chamber 2d, resulting in a complicated structure of the housing 2 and leading to increase in number of components. As a result, there take place an unavoidable increase in time and effort spent on manufacturing processes and assembling processes of the apparatus as well as an unavoidable increase in manufacturing costs due to the former.

SUMMARY OF THE INVENTION

An object of the present invention is therefore to provide a filter apparatus for a canister, which makes it possible to simplify the structure so as to decrease the number of components.

The present invention will be described below. Reference numerals appearing in the accompanying drawings will be given to the following description with parentheses for facilitating the understanding of the present invention. The present invention is not however limited only to embodiments illustrated in the drawings.

The aforementioned object can be attained by a filter apparatus (20A, 20B, 40A, 40B) for a canister of the present invention which is to be connected to an outlet portion (17c) of the canister (12) mounted on a fuel supply system (10) for a vehicle and comprises:

a housing (21, 41) having a connection opening portion (25, 45), which is to be connected to said outlet portion and an atmospheric release opening portion (26, 46) communicating with an atmosphere;

a filter element (30, 50) received in said housing;

wherein:

said filter element is provided with a filter body (31, 51) having a filtering function and with a partition (32, 52), which divides, in cooperation with said filter body, an inside of said housing into a clean-side zone (S1) communicating with said connection opening portion and a dirty-side zone (S2) communicating with said atmospheric release opening portion; and said partition is provided with a one-way valve (33, 53), which permits fluid to pass from said clean-side zone to said dirty-side zone and prevents said fluid from passing from said dirty-side zone to said clean-side zone.

According to the present invention, the one-way valve (33, 53) is mounted on the filter element (30, 50), and it is accordingly unnecessary to provide the inside of the housing with any chamber for the one-way valve other than a filter element-receiving chamber. As a result, the shape of the housing can be simplified so as to decrease in number of components. It is therefore possible to decrease time and effort spent on manufacturing processes and assembling processes of the apparatus and reduce the manufacturing cost.

In the filter apparatus of the present invention the filter body may be formed into a hollow cylindrical shape or a flat plate shape. When the filter body having the hollow cylindrical shape is used, there may be adopted a structure in which one end of the filter body is joined to an inner wall of the housing so that a hollow portion (31a) of the filter body is connected to the connection opening portion (25) from the inside of the housing (21); the partition (32) is disposed at a side of the other end of the filter body; and there is provided the one-way valve (33), which permits the fluid introduced to a side of the other end of the hollow portion to pass therethrough and prevents the fluid from flowing into the hollow portion. When the filter body having the flat plate shape is used, there may be adopted a structure in which the partition is joined to the filter body so as to surround the outer periphery of the filter body; and the partition is joined over its entire periphery to the inner wall of the housing.

The aforementioned object can also be attained by a filter apparatus (20A, 20B) for a canister of the present invention which is to be connected to an outlet portion (17c) of the canister (12) mounted on a fuel supply system (10) for a vehicle and comprises:

a housing (21) having a connection opening portion (25), which is to be connected to said outlet portion and an atmospheric release opening portion (26) communicating with an atmosphere;

a filter element (30) received in said housing so that a hollow portion (31a) passing through a center of a filter body (31) of said filter element is connected to said connection opening portion from the inside of said housing at one end of said hollow portion;

wherein:

said hollow portion of said filter element is utilized as a part of a passage for introducing fluid, which has been introduced from said canister into said connection opening portion, into said atmospheric release opening portion; and there is provided at an other end of said hollow portion a one-way valve (33), which permits the fluid to discharge from a side of said other end of said hollow portion and prevents the fluid from flowing from the side of said other end into said hollow portion.

According to the present invention, the fluid discharged from the canister (12) is introduced through the hollow portion (31a) of the filter element into the atmospheric release opening portion (26), and it is accordingly unnecessary to separate, at the connection opening portion (25), the passage for the fluid discharged from the canister and the passage for the air, which has been filtered by means of the filter element from each other. The one-way valve (33) can be provided at the other end of the hollow portion of the filter element, with the result that the filter element and the one-way valve can be received in the common chamber in the housing (21). The shape of the housing of the filter apparatus (20A, 20B) can accordingly be simplified so as to decrease in number of components. It is therefore possible to decrease time and effort spent on manufacturing processes and assembling processes of the apparatus and reduce the manufacturing cost.

In another embodiment of the filter apparatus there may be adopted a structure in which an end plate (32) is secured to the end of the filter body (31) of the filter element (30) and the one-way valve (33) is secured to the end plate. In this case, with respect to the shape of the housing (21), a simple vessel, which can receive the filter element (30) suffices.

The one-way valve (33) may have a structure in which the one-way valve can come into close contact with a valve seat (32b) by its own weight to close the hollow portion (31a) or can be apart from the valve seat under a function of pressure of the fluid introduced into the hollow portion. In this case, the pressure of the fluid introduced from the canister (12) into the hollow portion (31a) of the filter element (30) causes the one-way valve (33) to open, thus making it possible to discharge the fluid so as to bypass the filter body (31). In case that the suction of air takes place in the canister, the pressure of the hollow portion of the filter element becomes negative so that the one-way valve comes into close contact with the valve seat (32b). Utilization of the negative pressure applied to the hollow portion of the filter element causes the one-way valve to close, and no power is therefore required for operating the one-way valve, thus obtaining the more simplified structure of the filter apparatus (20A, 20B). The negative pressure applied to the hollow portion becomes larger, according as airflow resistance in the filter body increases after a lapse of time. It is therefore possible to securely close the one-way valve when introducing the air into the side of the canister.

The aforementioned object can also be attained by a filter apparatus (40a, 40b) for a canister of the present invention which is to be connected to an outlet portion (17c) of the canister (12) mounted on a fuel supply system (10) for a vehicle, comprises:

a housing (41) having a connection opening portion (45), which is to be connected to said outlet portion and an atmospheric release opening portion (46) communicating with an atmosphere;

a filter element (50) received in said housing;

wherein:

said filter element is provided with a filter body (51), which has a filtering function and a flat plate shape and with a partition (52) connected to said filter body so as to surround said filter body;

said partition is joined over its entire periphery to an inner wall of said housing so as to divide an inside of said housing into a clean-side zone (S1) communicating with said connection opening portion and a dirty-side zone (S2) communicating with said atmospheric release opening portion; and said partition is provided with a one-way valve (53), which permits fluid to pass from said clean-side zone to said dirty-side zone and prevents said fluid from passing from said dirty-side zone to said clean-side zone.

In this embodiment the filter element (50) is provided with the one-way valve (53) in the same manner as in previous embodiments of the present insertion and the shape of the housing can accordingly be simplified so as to decrease the number of components. It is therefore possible to decrease time and effort spent on manufacturing processes and assembling processes of the apparatus and reduce the manufacturing cost. The filter body (51) formed into a flat plate shape permits to decrease the height of the housing in the thickness direction (i.e., in the vertical direction of FIG. 5) of the filter body (51)

In another embodiment of the filter apparatus there may be adopted a structure in which the partition (52) is provided with a tubular member (52c), which connects the clean-side zone (S1) with the dirty-side zone (S2);

the tubular member is provided on its forward end portion with a valve seat (52d), which extends in a perpendicular direction when the filter apparatus is kept in its used condition; and the one-way valve (53) has a structure in which the one-way valve can come into close contact with the valve seat by its own weight to close the tubular member or can be apart from the valve seat under a function of pressure of the fluid introduced from the connection opening portion into the clean-side zone.

In this case, no power is required for operating the one-way valve (53) thus obtaining the more simplified structure of the filter apparatus (40A, 40B). The negative pressure applied to the hollow portion becomes larger, according as airflow resistance in the filter body increases after a lapse of time. It is possible to securely close the one-way valve when introducing the air into the side of the canister.

DETAILED DESCRIPTION OF THE PREFERRED EMBODIMENTS

Now, embodiments of a filter apparatus for a canister of the present invention will be described in detail below with reference to the accompanying drawings.

Figure 2:
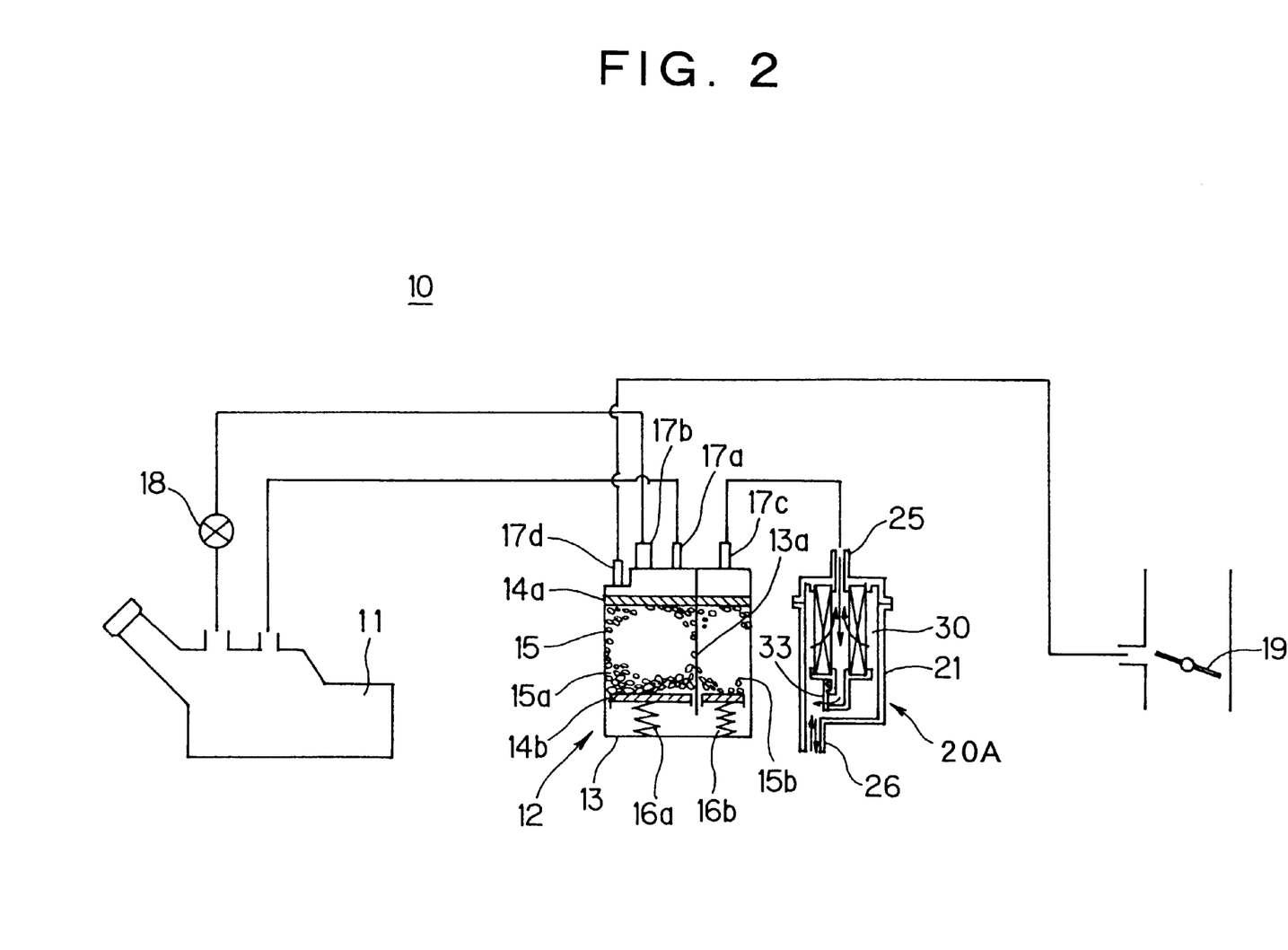
FIG. 2 is a schematic view illustrating a fuel supply system into which the filter apparatus for a canister as shown in FIG. 1 is built.

FIG. 2 illustrates essential parts of a fuel supply system for a vehicle, into which a filter apparatus for a canister of the first embodiment of the present invention is built. The fuel supply system 10 is provided with a canister 12 connected to a fuel tank 11, and with a filter apparatus 20A connected to the canister 12. The canister 12 has a housing 13, a pair of upper and lower partitions 14a, 14b disposed in the inside of the housing 13, and adsorbent such as an activated carbon, with which the space between the upper and lower partitions 14a, 14b is filled. Each of the partitions 14a, 14b is formed by placing a filter layer made of felt on a grid plate having a plurality of small apertures. The lower partition 14b is movable upward and downward in the housing 13. Force, which is given by springs 16a, 16b and have a function of moving upward the lower partition 14b is applied thereto. The housing 13 is provided in its inside with a separating wall 13a, which divides the adsorbent 15 into right and left-hand adsorbents 15a, 15b.

The housing 13 is provided at its upper portion with first and second inlet portions 17a, 17b, an outlet portion 17c and a purge-opening portion 17d. Both the inlet portions 17a, 17b are connected to the fuel tank 11 of the vehicle. The second inlet portion 17b is connected through a valve 18 to the fuel tank 11. The valve 18 can be opened when a large amount of vaporous fuel is generated, and fuel is supplied for example to the fuel tank 11. The valve 18 kept under an opening condition causes both the inlet portions 17a, 17b to communicate with the fuel tank 11. The valve 18 kept under a closing condition causes only the inlet portion 17a to communicate with the fuel tank 11 on the other hand.

The vapor sucked from the fuel tank 11 through the inlet portions 17a, 17b passes through the left-hand adsorbent 15a at the left-hand side of the separating wall 13a to move below the partition 14b. The vapor moving below the partition 14b is introduced through a portion below the separating wall 13a into the right-hand adsorbent 15b. Air, which has passed the adsorbent 15b is discharged through the filter apparatus 20A into the atmosphere from the outlet portion 17c. When the pressure of the fuel tank 11 decreases under a prescribed pressure value, the pressure in the canister 12 becomes negative so that air is introduced through the filter apparatus 20A into the canister 12 from the outlet portion 17c. An inlet pressure at a throttle valve 19 provided in an inlet system of an internal combustion engine is applied to the purge opening portion 17d. Vapor containing fuel contents is sucked from the purge-opening portion 17d into the throttle valve 19 in accordance with the above-mentioned inlet pressure.

Figure 1:
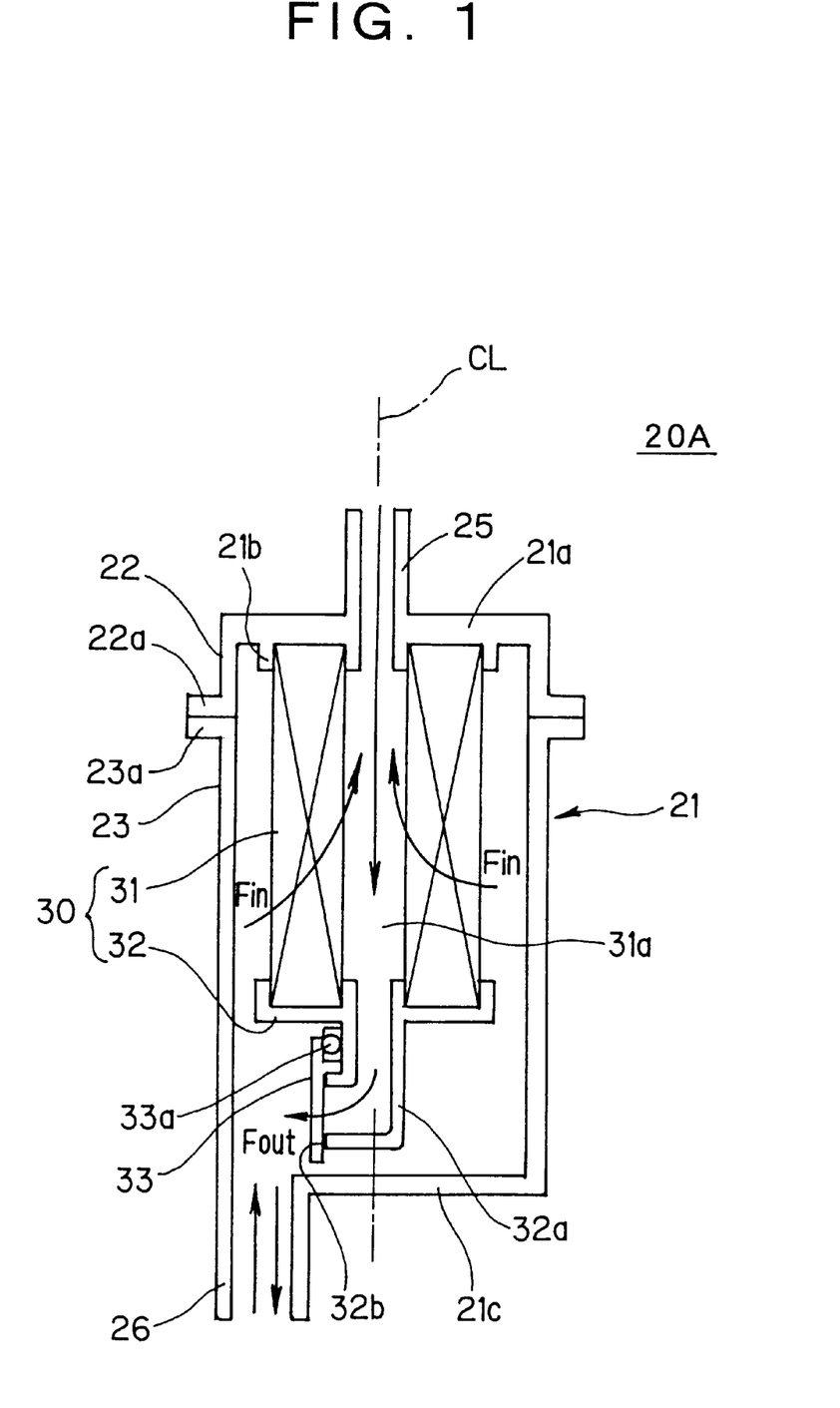
FIG. 1 is a vertical sectional view illustrating a filter apparatus for a canister of the first embodiment of the present invention.

FIG. 1 illustrates the filter apparatus 20A in detail. The filter apparatus 20A is composed of a housing 21 and a filter element 30 received in the housing 21. The housing 21 is obtained by heat bonding a pair of pieces at their connection flanges 22a, 23a to each other, which pieces are formed of synthetic resin by an injection molding method. The housing 21 is formed into a cylindrical shape having a central line, which is identical with the axial line CL extending in the vertical direction in FIG. 1. The shape of the housing 21 may however be modified. The housing 21 is provided with one end wall 21a, which has a connection opening portion 25 formed on the central portion of the end wall 21a. The connection-opening portion 25 is connected with the outlet portion 17c of the canister 12 (see FIG. 2). The connection-opening portion 25 is formed into a tubular shape, which projects upward and downward from the end wall 21a. The end wall 21a has on its inner surface (i.e., its under surface as shown in FIG. 1) a ring-shape projection 21b, which is concentric with the connection opening portion 25. The housing 21 is provided with the other end wall 21c on which an atmospheric release-opening portion 26 having a tubular shape is formed.

The filter element 30 is composed of a filter body 31 formed of filter paper or the like and of an end plate 32, which is secured to the lower end surface of the filter body 31 and serves as a partition. The filter body 31 is formed into a cylindrical shape, which has in its center a hollow portion 31a. The upper end side of the filter body 31 is fitted into the inside of the ring-shape projection 21b of the end wall 21a of the housing 21. Under such a fitting condition, the hollow portion 31a is connected to the connection-opening portion 25 from the inner side of the housing 21. The filter body 31 and the end plate 32 divide the inside of the housing 21 into a clean-side zone S1 communicating with the connection opening portion 25 and a dirty-side zone S2 communicating with the atmospheric release opening 26. The filter body may be fixed to the ring-shaped projection 21b by means of a fastening means such as an adhesive agent so as to prevent the filter element 30 from coming down in the housing 21.

The end plate 32 is provided with a tubular member 32a, which communicates with the hollow portion 31a. The tubular member 32a has its lower end portion, which bends in the horizontal direction. The end surface (i.e., a valve seat) 32b of the tubular member 32a is substantially identical with a perpendicular plane. A one-way valve 33 is mounted on the end plate 32 so as to be swingable around a hinge shaft 33a. The oneway valve 33 comes into close contact with the above-mentioned end surface 32a on condition that it is hanged from the hinge shaft 33a in the perpendicular direction by its own weight. The end plate 32 may be formed integrally with the filter body 31 by carrying out, for example, an injection molding method in which the filter body 31 is used as an insert member.

In the above-described filter apparatus 20A, air that is discharged from the outlet portion 17c of the canister 12 into the filter apparatus 20A is introduced from the hollow portion 31a of the filter element 30 into the tubular member 32a as indicated in FIG. 1 in the form of arrow "F out". The pressure of the thus introduced air causes the one-way valve 33 to open apart from the end surface 32b so as to permit release of the air into the atmosphere from the atmospheric release opening portion 26.

When the pressure of the canister 12 becomes negative so that air is sucked into the canister from the outlet portion 17c, on the other hand, the resultant suction force causes the one-way valve 33 to come into close contact with the end surface 32b of the tubular member 32a. Air that is sucked into the housing 21 from the atmospheric release opening portion 26 passes through the filter body 31 as indicated in FIG. 1 in the form of arrow "F in" and is then sucked into the canister 12 through the hollow portion 31a and the connection opening portion 25. Accordingly as air-flow resistance in the filter body 31 of the filter element 30 increases after a lapse of time, the negative pressure applied to the hollow portion 31a becomes larger, resulting in increase in force having the function of closing the one-way valve 33. It is therefore possible to carry out a secure and proper filtration of air sucked into the canister 12 from the filter apparatus 20A, even when there is adopted a simple structure in which the one-way valve 33 is hanged from the hinge shaft 33a so as to be able to come, by its own weight, into close contact with the end surface 32b of the tubular member 32a, which serves as the valve seat. In addition, there is required no power source such as a spring for urging the one-way valve 33 against the end surface 32b. There is a small resistance upon opening the one-way valve 33, thus making it possible to discharge smoothly air introduced from the canister 12.

Figure 3:
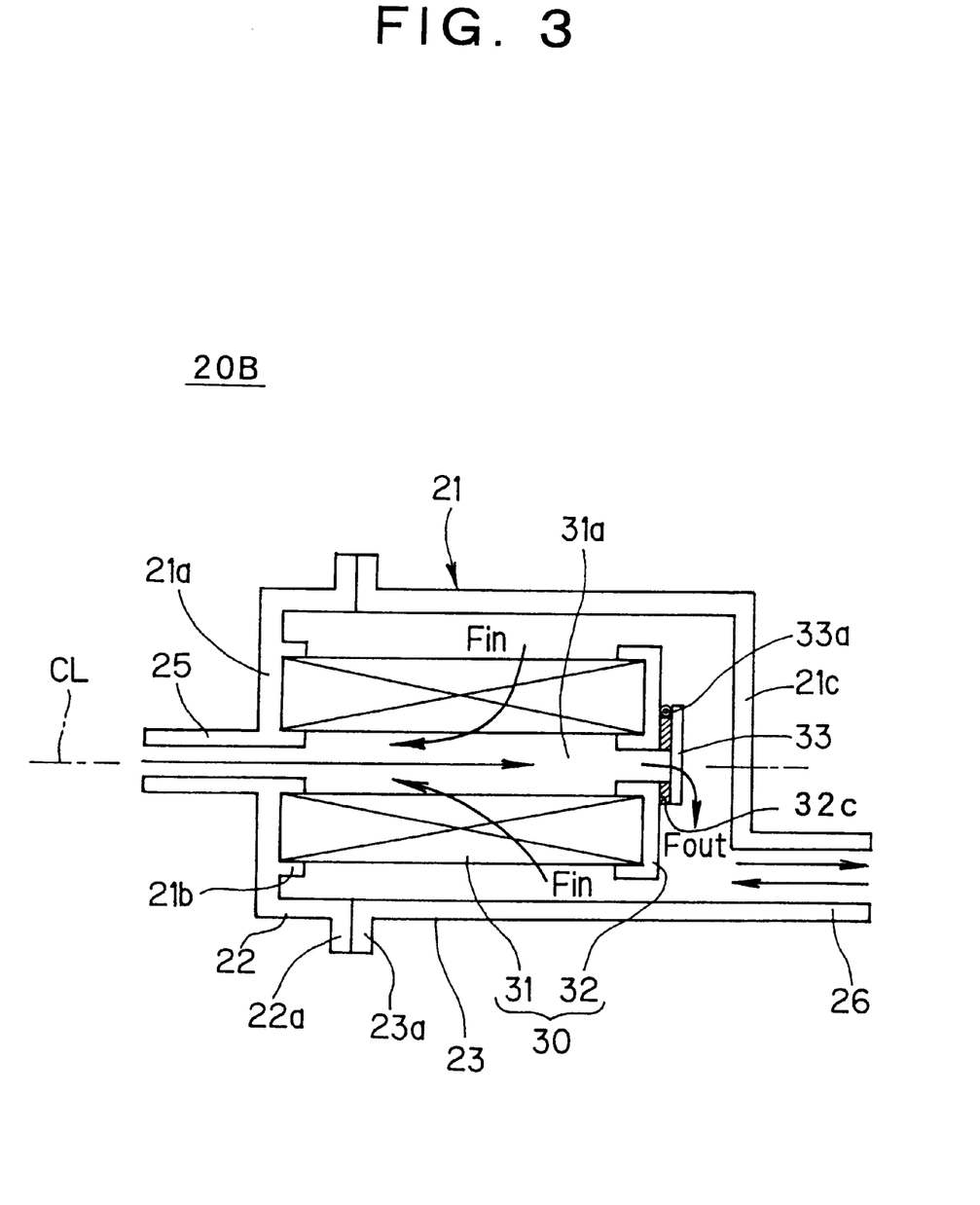
FIG. 3 is a vertical sectional view illustrating a filter apparatus for a canister of the second embodiment of the present invention.

In the first embodiment of the present invention described above, the one-way valve 33 may be disposed above the filter element 30. In the first embodiment as shown in FIG. 1, the filter apparatus 20A is described as being mounted on the vehicle in a vertical posture in which the axial line of the hollow portion 31a of the filter element 30 is substantially identical with the vertical line. The present invention may also be applied to a filter apparatus 20B, which is to be mounted on the vehicle in a horizontal posture as shown in FIG. 3, in which the axial line of the hollow portion 31a of the filter element 30 is substantially identical with the horizontal line. In this case, the tubular member 32a is omitted, the one-way valve 33 is disposed on a plane, which is substantially identical with the surface 32c of the end plate 32, which serves as the valve seat for the one-way valve 33. Places of the filter apparatus 26, on which the connection opening portion 25 and the atmospheric release opening portion 26 should be formed are not limited to ones described in the first embodiment, and they may be formed on any places of the housing, other than the end portions in the longitudinal direction thereof.

Figure 4:
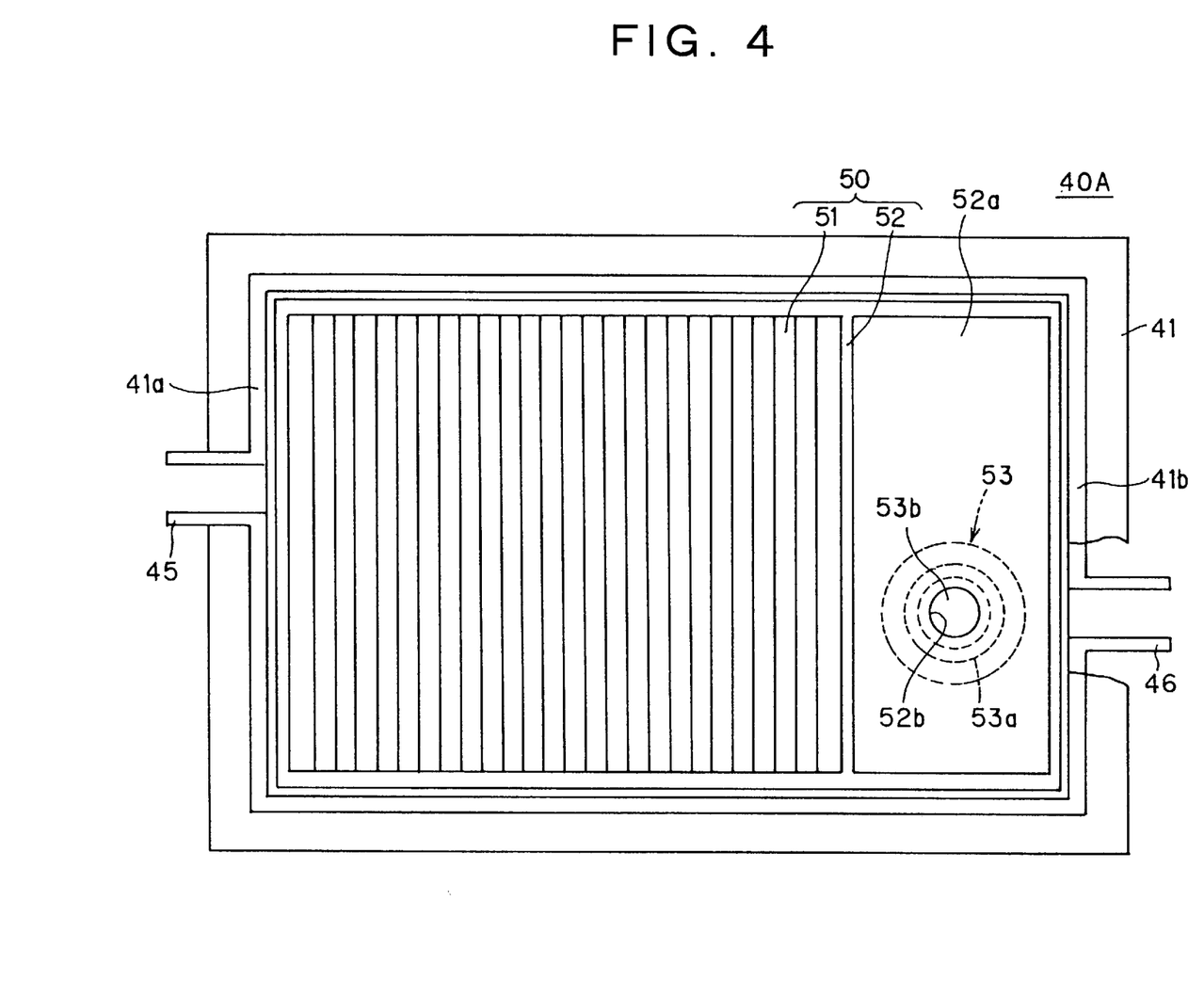
FIG. 4 is a horizontal sectional view illustrating a filter apparatus for a canister of the third embodiment of the present invention.
Figure 5:
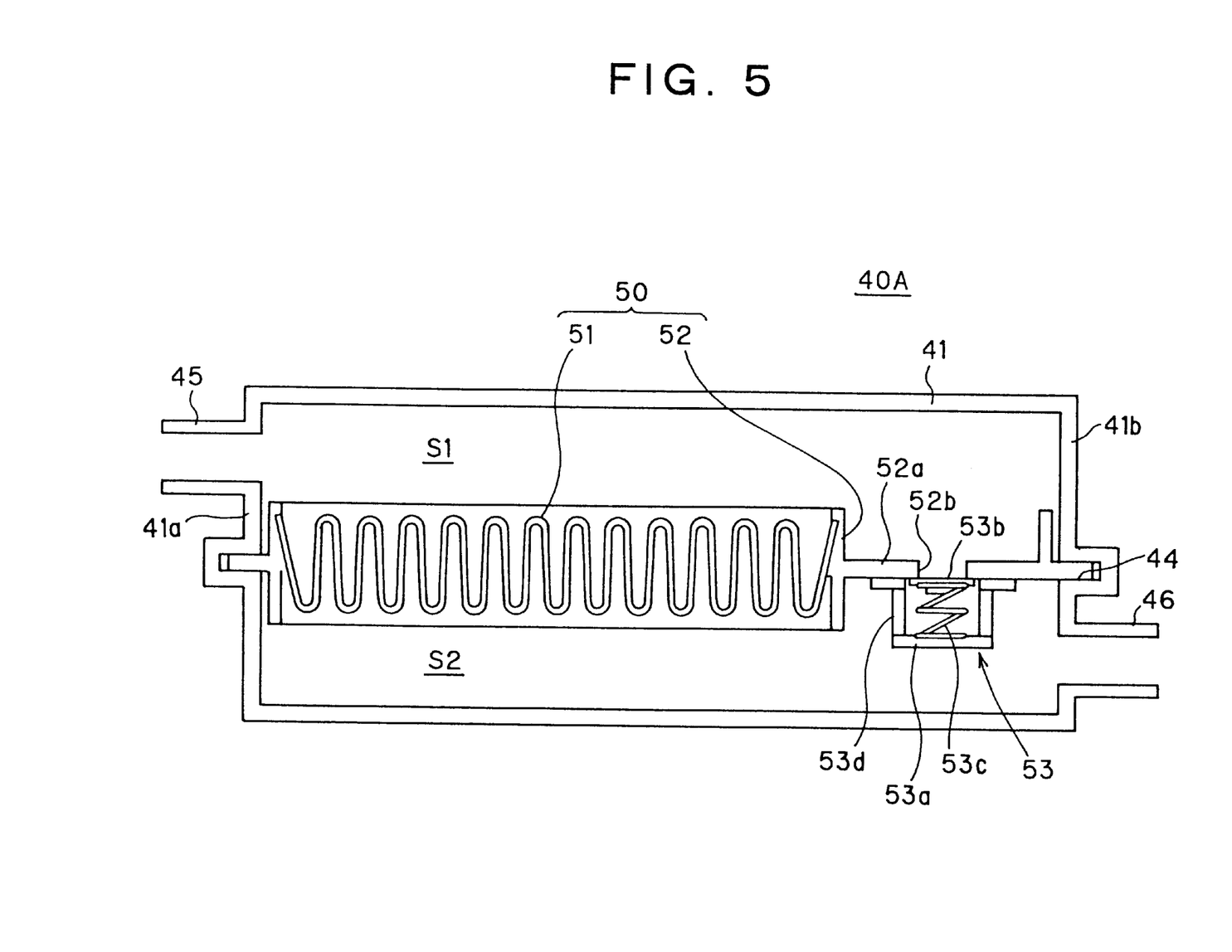
FIG. 5 is a vertical sectional view illustrating the filter apparatus as shown in FIG. 4.

FIGS. 4 and 5 illustrate a filter apparatus for a canister of the second embodiment of the present invention. The filter apparatus 40A is composed of a housing 41 and a filter element 50 received in the housing 41. The housing is formed of synthetic resin into a rectangular parallelepiped vessel by an injection molding method or the like. the housing 41 has in its central portion in the thickness direction (i.e., in the vertical direction in FIG. 5) a groove portion 44 formed over the entire periphery of the inner surface of the housing 41. The housing 41 is provided with one end wall 41, which is located on one side in the longitudinal direction of the housing 41 and has a connection opening portion 45 connected to the outlet portion 17c of the canister 12 (see FIG. 2) and with the other end wall 41b, which is located on the other side in the same direction and has an atmospheric release opening portion 46 having a tubular shape. The connection-opening portion 45 is located above the groove portion 44 and the atmospheric release-opening portion 46 is located below the groove portion 44.

The filter element 50 is composed of a filter body 51 formed of filter paper, which is pleated into an external form of flat plate, and a frame 52 joined to the filter body 51 so as to surround the periphery of the filter body 51. The frame 52 is formed integrally with the filter body 51 by carrying out, for example, an injection molding method in which the filter body 51 is used as an insert member. The frame 52 has a flange 52a formed on the outer periphery of the frame 52 over the entirety thereof. The peripheral portion of the flange 52a is fitted into the groove 44 of the housing 41 so that the inside of the housing 41 is divided into a clean-side zone S1 communicating with the connection opening portion 45 and a dirty-side zone S2 communicating with the atmospheric release opening 46.

The flange 52a has a through-hole 52b formed thereon, which connects the both zones S1, S2 with each other. The through-hole 52b can be opened and closed by means of a one-way valve 53 mounted on the flange 52a. The one-way valve 53 is composed of a valve retainer 53a, a valve element 53b and a compression spring 53c. The valve retainer 53a has a tubular shape with a bottom and is joined to the flange 52a in the dirty-side zone S2 so as to be concentric with the through-hole 52b. The valve element 53b is received in the valve retainer 53a. The compression spring 53c is located between the valve element 53b and the valve retainer 53a so as to press the valve element 53b against the flange 52a to close the through-hole 52b.

In the above-described filter apparatus 40A, when air is discharged from the outlet portion 17c of the canister 12 into the filter apparatus 40A and the pressure of the clean-side zone S1 exceeds the pressure of the dirty-side zone S2 by a prescribed value, then the valve element 53b is apart from the through-hole 52b against the function of the spring 53c so that the air flows from the clean-side zone S1 into the dirty-side zone S2 through the through-hole 52b and vent holes 53d formed on the side wall of the valve retainer 53a. The air discharged from the canister 12 is therefore discharged into the atmosphere through the atmospheric release-opening portion 46 without passing through the filter body 51.

When the pressure of the canister 12 becomes negative so that air is sucked from the outlet portion 17c into the canister 12, the resultant suction force and the force given by the spring 53c cause the valve element 53b of the one-way valve 53 to come into close contact with the flange 52a so as to close the through-hole 52b. Accordingly, the air that has been sucked from the atmospheric release opening portion 46 into the housing 41 passes through the filter body 51 and is then sucked into the canister 12.

Also in the second embodiment describe d above, according as air-flow resistance in the filter body 51 increases after a lapse of time, the negative pressure applied to the clean-side zone S1 becomes larger, resulting in increase in force having the function of closing the through-hole 52b with the valve element 53b of the one-way valve 53.

Figure 6:
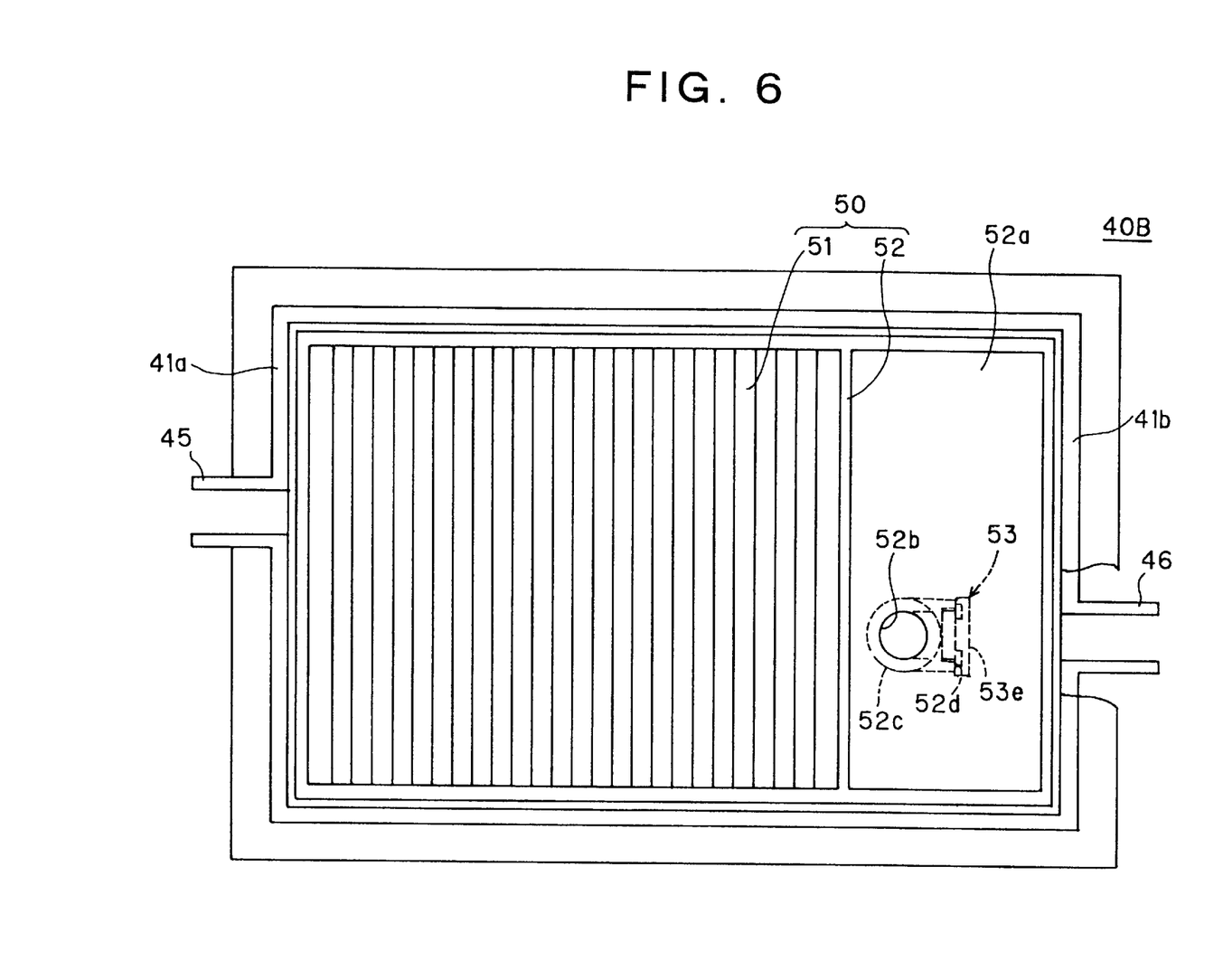
FIG. 6 is a horizontal sectional view illustrating a filter apparatus for a canister of the fourth embodiment of the present invention.
Figure 7:
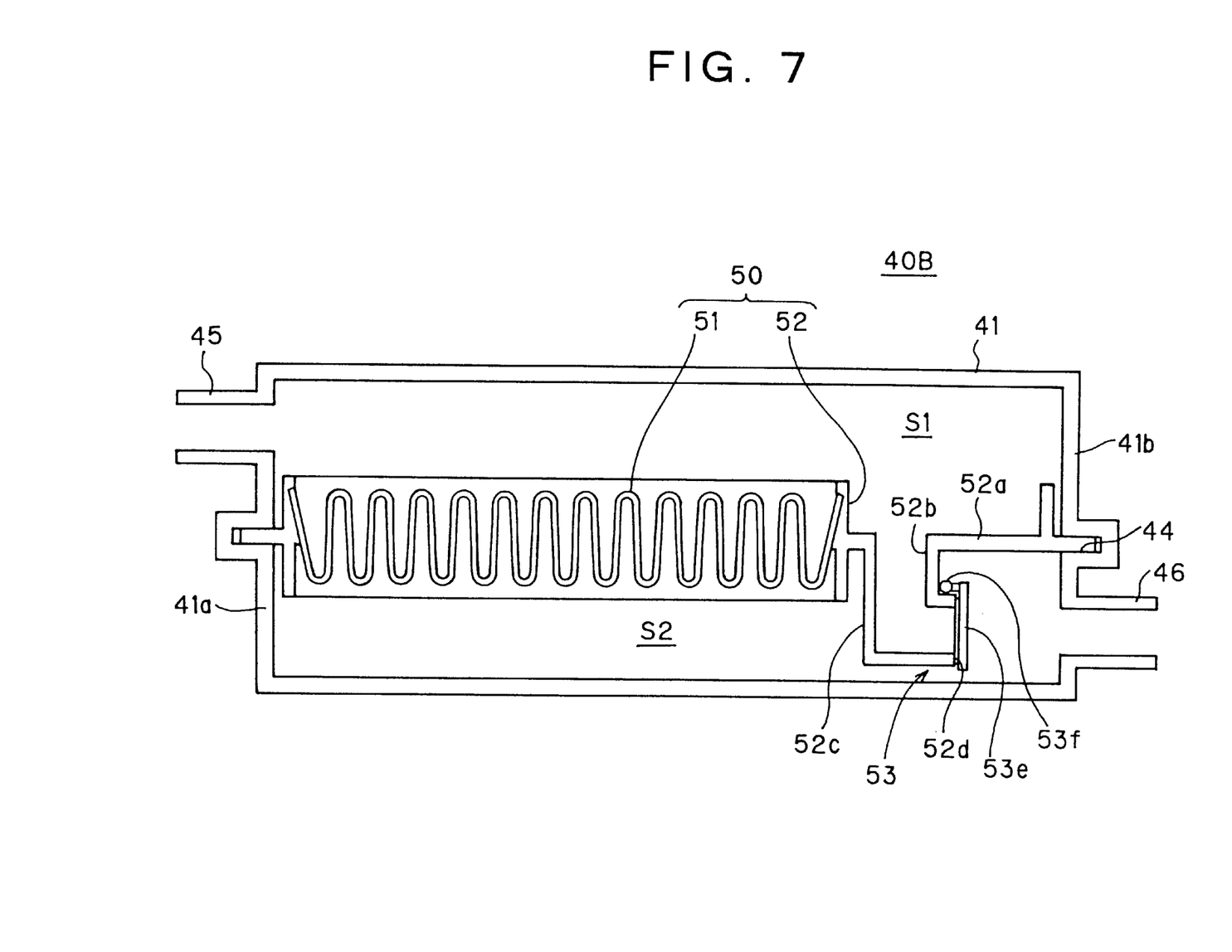
FIG. 7 is a vertical sectional view illustrating the filter apparatus as shown in FIG. 6.

FIGS. 6 and 7 illustrate a filter apparatus for a canister of the third embodiment of the present invention. The filter apparatus 40B is identical with the filter apparatus 40A as shown in FIGS. 4 and 5 except that the one-way valve is changed to the same one as that shown in FIG. 1. More specifically, the flange 52a is provided with a tubular member 52c, which projects toward the side of the dirty side zone S2. The lower end portion of the tubular member 52c bends in the horizontal direction. The end surface (i.e., a valve seat) 52d of the tubular member 52c is substantially identical with a perpendicular plane. A valve element 53e of a one-way valve 53 is mounted on the end surface 52d so as to be able to come into close contact therewith. The valve element 53e comes into close contact with the above-mentioned end surface 52d on condition that it is hanged from a hinge shaft 53f in the perpendicular direction by its own weight. The filter apparatus 40B is mounted on a vehicle in a posture in which the axial line of the filter body 51 is substantially identical with the horizontal line.

Also in the above-described third embodiment, air that has been introduced from the canister 12 into the clean-side zone S1 passes through the one-way valve 53 without passing through the filter body 51 and is then discharged into the atmosphere through the atmospheric release opening portion 46. When the pressure of the canister 12 becomes negative, the valve element 53e of the one-way valve 53 comes into close contact with the end surface 52d of the tubular member 52c so that the air flowing into the dirty-side zone S2 passes through the filter body 51 and is then sucked from the clean-side zone S1 into the canister 12.

The present invention is not limited only to the above-described embodiments and can be worked in the form of the other embodiments. For example, the filter body 31, 51 is not limited only to one formed of a pleated filter paper. The end plate 32 and the frame 52, which serve as the partition may be connected to the filter bodies 31 and 51 by the conventional connecting means such as bonding by adhesive agent, heat-bonding or the like, respectively, other than the formation of the integral body of the former with the latter by the insert forming method.

According to the present invention as described in detail, since the inside of the housing is divided into the clean-side zone and the dirty-side zone by the filter element, which is provided with the one-way valve, the shape of the housing can be simplified so as to decrease in number of components. It is therefore possible to decrease time and effort spent on manufacturing processes and assembling processes of the apparatus and reduce the manufacturing cost. When there is adopted a structure that the one-way valve can come into close contact with the valve seat by its own weight to close the hollow portion and can be away from the valve seat under the function of pressure of the fluid given in the hollow portion, then no power is required for operating the one-way valve, thus leading to the more simplified structure of the filter apparatus. Especially, force having the function of closing the one-way valve increases, according as airflow resistance in the filter body of the filter element increases after a lapse of time. It is therefore possible to carry out a secure and proper filtration of air sucked into the canister from the filter apparatus, thus improving reliability of the filter apparatus.

What is claimed is:

1. A filter apparatus for a canister which is to be connected to an outlet portion of the canister mounted on a fuel supply system for a vehicle, comprising:

a housing having a connection opening portion, which is to be connected to said outlet portion and an atmospheric release opening portion communicating with an atmosphere;

a filter element received in said housing;

wherein:

said filter element is provided with a filter body having a filtering function and with a partition, which divides, in cooperation with said filter body, an inside of said housing into a clean-side zone communicating with said connection opening portion and a dirty-side zone communicating with said atmospheric release opening portion; said filter body being formed into a hollow cylindrical shape and having a first end and an opposite second end, said first end of said filter body being joined to an inner wall of said housing so that one end of a hollow portion of said filter body is connected directly to said connection opening portion from inside the housing; said hollow portion being located in said clean-side zone and serving not only as a part of a passage for introducing fluid, which has been introduced from said canister into said connection opening portion, into said atmospheric release opening portion, but also as a part of another passage for introducing fluid, which has been filtered through said filter element, into said connection opening portion; and said partition is disposed at a side of the second end of said filter body; said partition being provided with a one-way valve, which permits fluid introduced to a side of an other end of said hollow portion to pass through said one-way valve to said dirty-side zone and prevents said fluid from passing from said dirty-side zone to said clean-side zone to flow into said hollow portion.

2. A filter apparatus for a canister, which is to be connected to an outlet portion of the canister mounted on a fuel supply system for a vehicle, comprising:

a housing having a connection opening portion, which is to be connected to said outlet portion and an atmospheric release opening portion communicating with an atmosphere;

a filter element received in said housing so that a hollow portion passing through a center of a filter body of said filter element is connected to said connection opening portion from an inside of said housing at one end of said hollow portion;

wherein:

said hollow portion of said filter element serves not only as a part of a passage for introducing fluid, which has been introduced from said canister into said connection opening portion, into said atmospheric release opening portion, but also as a part of another passage for introducing fluid, which has been filtered through said filter element, into said connection opening portion; and there is provided at an other end of said hollow portion a one-way valve, which permits the fluid to discharge from a side of said other end of said hollow portion and prevents the fluid from flowing from the side of said other end into said hollow portion.

3. The apparatus as claimed in claim 2, wherein:

an end plate is secured to an end of said filter body of said filter element and said one-way valve is secured to said end plate.

4. The apparatus as claimed in claim 2, wherein:

said one-way valve has a structure in which said one-way valve can come into close contact with a valve seat by its own weight to close said hollow portion or can be apart from said valve seat under a function of pressure of the fluid introduced into said hollow portion.

* * * * *